United States Patent Office 3,835,103
Patented Sept. 10, 1974

3,835,103
FLAME-RETARDANT POLYMERS
Gedaleia Waldner, Rechovot, and Jacob Alter, Tel-Aviv, Israel, assignors to Atomic Energy Commission of the State of Israel, Tel-Aviv, Israel
No Drawing. Filed Jan. 19, 1973, Ser. No. 325,006
Claims priority, application Israel, Jan. 21, 1972, 38,610
Int. Cl. C08f 19/18
U.S. Cl. 260—80.6                1 Claim

ABSTRACT OF THE DISCLOSURE

Flame-retardant polymers of 70–80% by weight styrene, 1–3% by weight vinylidene chloride or vinyl bromide and the balance of acrylonitrile.

---

The invention relates to flame-retardant polymers and in particular to fire-retardant polymers of styrene and acrylonitrile. It is known from British Patent No. 975,970 (Monsanto) that copolymers of 95–99.5% by weight styrene and 5–0.5% acrylonitrile may be flame-retardant by the addition of a bromine containing compound such as in an amount of 0.5% by weight together with an activator.

We have now found that certain copolymers of the above compounds in different proportions are made flame-retardant even without the presence of an activator. The vinyl bromide may be substituted by vinylidene chloride in the same proportion.

The present invention accordingly provides a copolymer comprising between 70 and 80% of styrene, 1–3% by weight of vinyl bromide or vinylidene chloride and the balance being acrylonitrile. Preferably the vinyl bromide or vinylidene chloride should be present in a range of 2–3% by weight. The amount of vinyl bromide and vinylidene chloride within the given range is selected according to the degree of flame-retardancy required.

It has been found that when the proportion of styrene is less than 70% or more than 80% by weight, flame-retardancy is not imparted by the presence of vinyl bromide or vinylidene chloride alone.

Example 1

225 g. styrene were mixed together with 75 g. acrylonitrile and the mixture cooled with dry $CO_2$.
Vinyl bromide gas was passed through a solution of NaOH to remove the stabilizer and added to the mixture until 6 g. had been added. The cooled mixture was irradiated from a $\gamma$-source (Cobalt–60) until polymerisation was complete.
The resulting polymer was tested for flame retardancy and found to be flame-retardant.

Example 2

A mixture was prepared of 220 g. styrene, 60 g. acrylonitrile and 7 g. vinylidene chloride.
The mixture was polymerized by irradiation from a $\gamma$-source until completion of polymerisation.
The resulting polymer was tested for flame retardancy and found to be flame-retardant.

What we claim is:
1. A copolymer comprising between 70 and 80% by weight styrene, 1–3% by weight vinylidene chloride, the balance being of acrylonitrile.

References Cited

UNITED STATES PATENTS
2,991,270    7/1961    Roper et al. _____ 260—45.5

FOREIGN PATENTS
975,970    11/1964    England _____ 260—80.6

STANFORD M. LEVIN, Primary Examiner

U.S. Cl. X.R.
260—85.5 ZA; 204—159.22